US005373414A

United States Patent [19]

Kondo

[11] Patent Number: 5,373,414

[45] Date of Patent: Dec. 13, 1994

[54] SURGE ABSORBER

[75] Inventor: Zenichi Kondo, Tanakura, Japan

[73] Assignee: Kondo Electric Co., Ltd., Tanakura, Japan

[21] Appl. No.: 42,984

[22] Filed: Apr. 5, 1993

[30] Foreign Application Priority Data

Apr. 6, 1992 [JP] Japan .................................. 4-082550

[51] Int. Cl.5 ............................................... H02H 9/04

[52] U.S. Cl. ................................... 361/129; 361/120; 361/130; 337/29; 313/581; 313/595; 313/355

[58] Field of Search ....................... 361/120, 129, 130; 313/581, 595, 631, 235, 355; 338/21; 337/28, 29

[56] References Cited

U.S. PATENT DOCUMENTS 4,506,311 3/1985 Cline .................................. 361/130
4,727,350 2/1988 Ohkubo ................................ 338/21
5,216,325 6/1993 Patel et al. ........................... 313/595

FOREIGN PATENT DOCUMENTS 62-278781 12/1987 Japan .
63-99725 5/1988 Japan .
63-57918 11/1988 Japan .

*Primary Examiner*—Todd DeBoer
*Attorney, Agent, or Firm*—Kenjiro Hidaka

[57] ABSTRACT

A surge absorber has an insulating body having a flat surface on which a pair of electrically conductive thin-film terminal electrodes and, therebetween, one or more electrically conductive thin-film discharge electrodes of a predetermined shape or shapes are formed. Micro discharging gaps are present between each of the terminal electrodes and any of the discharging electrodes adjacent thereto and between any of the discharging electrodes adjacent to each other. The discharging electrodes are typically arranged in a row and column pattern. A thermostatic fuse may be provided on the opposite side of the insulating body from the side of the flat surface on which the terminal and discharge electrodes are present. The substantial part of the surge absorber is hermetically sealed in an enclosure. The enclosure is filled with a gas such as an inert gas.

14 Claims, 6 Drawing Sheets

SURGE ABSORBER

BACKGROUND OF THE INVENTION

1. Field of the Invention

The present invention relates to a surge absorber for protecting electrical circuits from a surge voltage. The surge absorber comprises an insulating body having a flat surface on which electrically conductive elements are formed leaving minute discharge gaps therebetween.

2. Description of the Prior Art

FIG. 7 shows one of the typical conventional surge absorbers. In FIG. 7, an electrically conductive thin film 41 is formed on the entire external circular peripheral surface of a cylindrical insulating body 40. The thin film 41 is made of carbon, metal oxides, etc. Terminal caps 42, 42 are fitted to the opposite ends of the insulating body 40. The electrically conductive thin film 41 is cut around the surface of the insulating body 40 by a laser cutter or a diamond cutter, etc. so that the thin film 41 is separated into a plurality of ring-shaped segments and micro grooves 43 are formed therebetween. The entire structure of the insulating body 40, the thin film and the terminal caps 42, 42 are sealed in a glass tube 44 which is filled with an inert gas or nitrogen gas. The Japanese published patent application 63-67918 (published 11-14-88) discloses a surge absorber of this type.

FIG. 7 also shows a thermostatic fuse 45 enclosed in the glass tube 44 for breaking the circuit when the environmental temperature reaches a predetermined level. A thermostatic fuse used for a surge absorber is disclosed in the Japanese laid-open patent application 63-99725 (laid-open 5-2-88).

However, when the thin film as described above is cut by laser cutter etc., the width of the formed micro grooves tends to fluctuate as time lapses and the edges of the micro grooves tend to be formed rough. On the other hand, since the discharge breakdowns occur across the micro grooves, the discharge starting voltage is substantially affected by the widths of the micro grooves and the condition of the edges of the micro grooves. The fluctuation of the discharge starting voltage is translated into a degraded quality of the products. Therefore, the groove cutting process requires an extreme attention and accuracy.

Since the groove cutting must be performed to each piece of the products individually, the products are not quite suitable for mass-production and the production is costly.

Referring back to FIG. 7, the conventional surge absorber sealed in a glass tube 44 with a thermostatic fuse 45 has a potential problem in that a splash of fused metal of the fuse 45 reaches the micro grooves 43, thereby causing the surge absorber to be short-circuited. One method of keeping the metal splash from the micro grooves 43 is to place a shielding plate 46 between the fuse 45 and the surge absorbing element. The reliability of this method, however, has not sufficiently been proved.

U.S. Pat. No. 4,727,350 (2-23-88) discloses a surge absorber in which micro grooves are formed on a cylindrical insulating body in a combination of a spiral groove and a linear groove which intersects the spiral groove.

Japanese laid open patent application 62-278781 (laid-open 12-3-87) discloses a surge absorber in which a plurality of electrically conductive film elements are formed on a surface of an insulating body, one of the elements being a grounding terminal, and a plurality of micro discharging gaps are provided between the non-grounded conductive film elements and the grounded element.

SUMMARY OF THE INVENTION

An object of the present invention is to provide a surge absorber having a good reliability and durability.

Another object of the present invention is to provide a surge absorber which can be mass-produced by a method of high productivity.

A further object of the present invention is to provide a surge absorber having a thermostatic fuse in which the used metal does not cause an accidental short-circuiting of the surge absorber.

In order to achieve the above objects, the surge absorber according to the present invention is mainly constructed as described below.

The surge absorber of the present invention has a flat plate-shaped insulating body. A pair of electrically conductive terminal electrodes are formed spaced apart on a flat surface of the insulating body. Between the pair of the terminal electrodes and on the flat surface of the insulating body are formed one or more electrically conductive discharging electrodes of a predetermined shape or shapes so that micro discharging gaps are present between each of the terminal electrodes and any of the discharging electrodes adjacent thereto and between any discharging electrodes adjacent to each other. A terminal lead is connected to each of the terminal electrodes. The surge absorber of the present invention may be provided with a thermostatic fuse.

The entire structure of the insulating body, the terminal electrodes, the discharging electrode or electrodes, and parts of the terminal leads are hermetically enclosed in a case. The thermostatic fuse, when provided, is also enclosed in the case. The case is filled with a gas which is one of inert gas, nitrogen gas, sulfur hexafluoride ($SF_6$) and air.

The thermostatic fuse is disposed on the opposite side of the plate-shaped insulating body from the side of the surface on which the terminal and discharging electrodes are formed. One end of the fuse is electrically connected to one of the terminal electrodes and the other end of the fuse is connected to a third lead which is extended to the outside of the case.

When an excessive surge voltage is applied across the two terminal leads, an aerial electric discharge occurs at the micro discharging gaps, then, an electrical current flows through the terminal electrodes, the discharging electrodes, and the micro discharging gaps, thereby resulting in a suppression of the surge voltage. The kind of the gas filled in the case and the pressure thereof, as well as the total dimension of the micro discharging gaps across the terminal electrodes, regulate the discharge starting voltage. In addition, when an excessive temperature is build up in tile case as a result of the discharge, thermostatic fuse will break the circuit. Since the thermostatic fuse is disposed on the opposite side of the insulating body from the side of the surface on which the terminal and the discharging electrodes are formed, no splash reaches the terminal or the discharging electrodes and the discharging gaps to cause an accidental short-circuiting of the surge absorber.

BRIEF DESCRIPTION OF THE DRAWINGS

The above and other objects and features of the invention will best be understood from the following description of embodiments thereof when read in connection with the accompanying drawings, in which.

DETAILED DESCRIPTION OF THE INVENTION

The surge absorber according to the present invention will now be described in detail in reference to the drawings.

Figure 1:
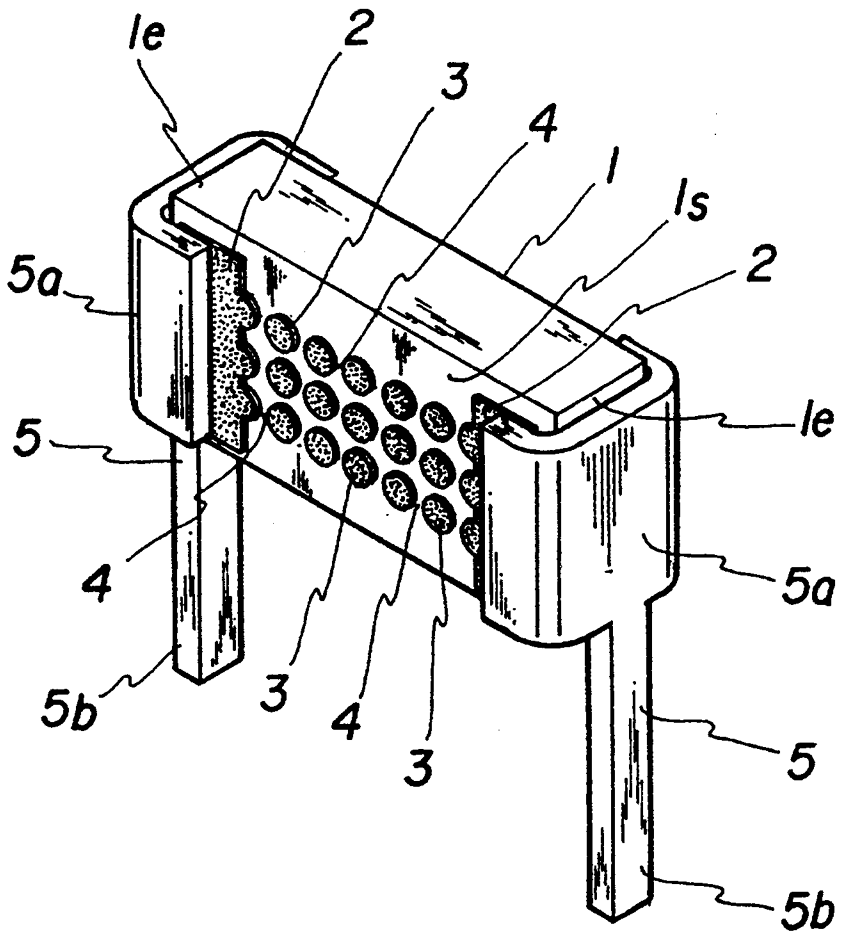
FIG. 1 is a front, top, right-side perspective view of a first embodiment of a surge absorber of the present invention.

FIG. 1 is a front, top, right-side perspective view of a first embodiment of a surge absorber S1 of the present invention. The surge absorber S1 has a fat rectangular-shaped insulating body 1 which is made of a sintered material such as mullite ceramic or steatite ceramic. The insulating body 1 has a flat surface 1*s* which is one of the two largest surfaces of the rectangular-shaped insulating body 1. The flat surface 1*s* 1*s* generally vertical, as shown in FIG. 1. On the flat surface Is and at, or, in the proximity of, the opposite ends of the insulating body 1 are formed a pair of electrically conductive terminal electrodes 2, 2. On the surface 1*s* and between two terminal electrodes 2, 2 are formed a plurality of electrically conductive discharge electrodes 3, each of which has a circular form. The terminal electrodes 2, 2 and the discharge electrodes 3 are positioned on the surface 1*s* so that micro discharging gaps 4 are present between each of the terminal electrodes 2, 2 and the discharge electrodes 3 adjacent thereto and between the discharge electrodes 3 adjacent to each other in the direction across the terminal electrodes 2, 2.

The terminal electrodes 2, 2 and the discharge electrodes are made of an electrically conductive thin film and they may be formed directly onto the surface 1*s* by a method such as printing, etching and eluting, or vapor depositing. Or, the terminal electrodes 2, 2 and the discharge electrodes 3 may be formed on the surface 1*s* in two separate steps. Namely, in the first step, they are produced in a flat thin form as separate parts by means of punching, etching, or slicing a bar-shaped material, etc.; and, in the second step, the parts separately produced are pasted on, pressed on, pressed in, or, embedded in the insulating body 1.

The suitable materials for the terminal electrodes 2, 2 and the discharge electrodes 3 are carbon, metal, electrically conductive ceramics, etc. Selection of the material is properly made in consideration of the desired electrical characteristics such as discharge starting voltage and discharge current, and, further, in consideration of the cost and productivity.

The surge absorber S1 also has a pair of terminals 5, 5, each of which consists of a holder 5*a* and a lead 5*b*. Each end 1*e* the insulating body 1 is securely press-fitted to the holder 5*a* of each of the terminals 5, 5 so that the terminals 5, 5 are individually electrically connected to the respective terminal electrodes 2, 2. The terminals 5, 5 are made of stainless steel, nickel, or alloys such as Kobar (a trade name of Westinghouse for an Fe-Ni-Co alloy). The leads 5*b*, 5*b* extend downwardly from the respective holders 5*a*, 5*a* so as to be connected to the circuit which is to be protected from a surge voltage.

Figure 2:
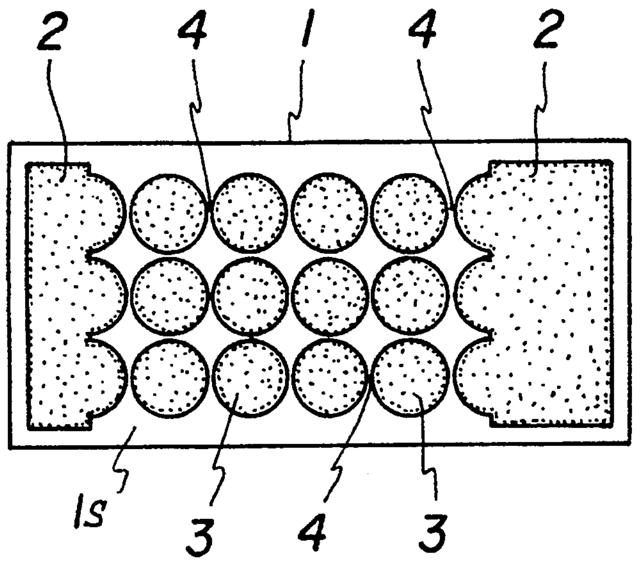
FIG. 2 shows one arrangement pattern of terminal electrodes and discharge electrodes formed on a surface of a insulating body of a surge absorber of the present invention.

FIG. 2 shows one arrangement pattern of terminal electrodes 2, 2 and discharge electrodes 3 formed on a surface 1*s* of a insulating body 1 of a surge absorber of the present invention.

In FIG. 2, the dimensions of all of the micro discharging gaps 4 between each of the terminal electrodes 2 and the discharge electrodes 3 adjacent thereto and between any discharge electrodes 3 adjacent to each other are equal. In this specification, each set of the discharge electrodes 3 arranged in the lateral direction, as viewed in FIG. 2, is defined as a "row", and each set of the discharge electrodes 3 arranged in the vertical direction, as viewed in FIG. 2, is defined as a "column". Namely, the discharge electrodes 3 shown in FIG. 2 are arranged in a three-row, four-column arrangement pattern. Although all of the discharge electrodes 3 shown in FIG. 2, or FIG. 1, are formed circular, the shade of the discharge electrodes 3 need not necessarily be circular. The shape may be oval, or a combination of more than one shape. The pattern of the discharge electrodes 3 may consist of a plurality of orderly repeating shapes. The number of the rows or the columns of the discharge electrodes 3 may not necessarily be three or four, respectively, as shown in FIG. 2, but any proper combination of numbers of one or more may be selected for the rows and the columns.

Figure 3:
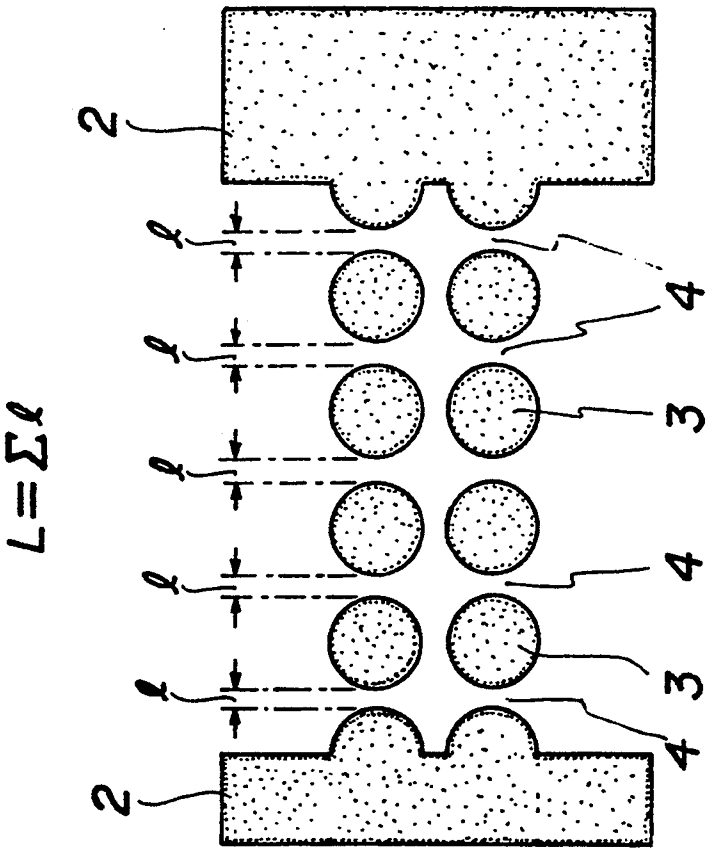
FIG. 3 shows another arrangement pattern of terminal electrodes and discharge electrodes for a surge absorber of the present invention.

Referring to FIG. 3, "L" signifies the summation of the dimension of each of the micro discharging gaps 4, which is referred to as "1" in FIG. 3, in a row. For example, when "1" is 100 μm, which is a typical dimension of the micro discharging gaps 3, the summation "L" of the pattern shown in FIG. B is 500 μm. The discharge starting voltage is a function of the sum of all of the discharge gaps 4 in a row. Therefore, various discharge starting voltages of a wide range can be obtained by changing the sum of the discharge gaps in a row. The number of the rows of the discharge electrodes 3 regulates the total amount of the discharge current. Therefore, various discharge currents of a wide range can be obtained by changing the number of the rows of the discharge electrodes 3.

Figure 4:
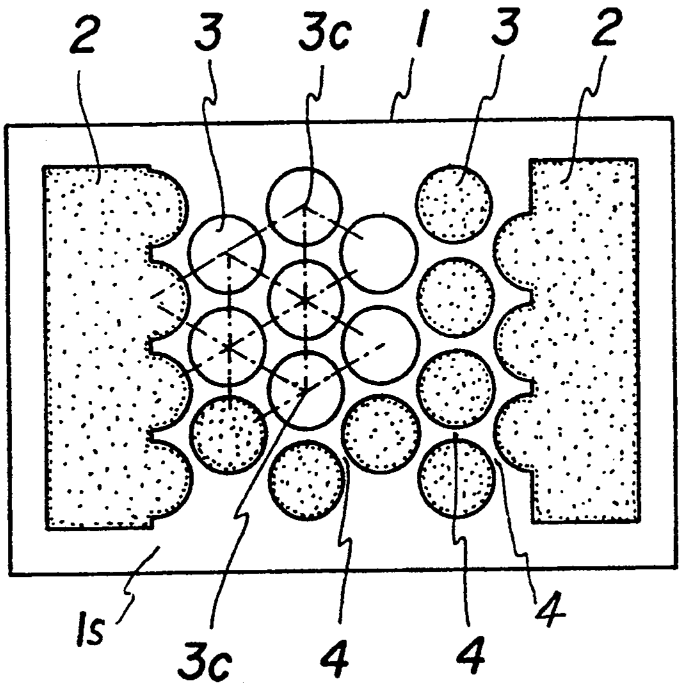
FIG. 4 shows an additional alternative arrangement pattern of terminal electrodes and discharge electrodes for a surge absorber of the present invention.

FIG. 4 shows an alternative arrangement pattern of terminal electrodes 2 and discharge electrodes 3 formed on a surface 1*s* of the insulating body 1 of the first embodiment. In FIG. 4, all of the discharge electrodes 3 are formed in an identical circular shape and are positioned in a laterally staggered arrangement as opposed to the laterally aligned arrangement, i.e. the arrangement in rows as shown in FIGS. 1, 2 and 3. The laterally staggered arrangement of this alternative pattern is made in such a manner that the centers of the three discharge electrodes 3 which are adjacent to each other form a right triangle, as shown in FIG. 4. In this arrangement, the dimensions of all of the micro discharging gaps 4 between each of the terminal electrodes 2 and any discharge electrodes 3 adjacent thereto and between any discharge electrodes 3 adjacent to each other are equal. By arranging the discharge electrodes 3 in this manner more discharge current flow routes are provided across the two terminal electrodes 2, 2 as compared to the previously described patterns in which the discharge electrodes 3 are arranged in laterally aligned, whereby the life of the discharge electrodes 3 can be extended. Consequential, the life of the surge absorber itself can be extended as well.

Next, the second embodiment of the present invention will be described in reference to FIG. 5.

Figure 5:
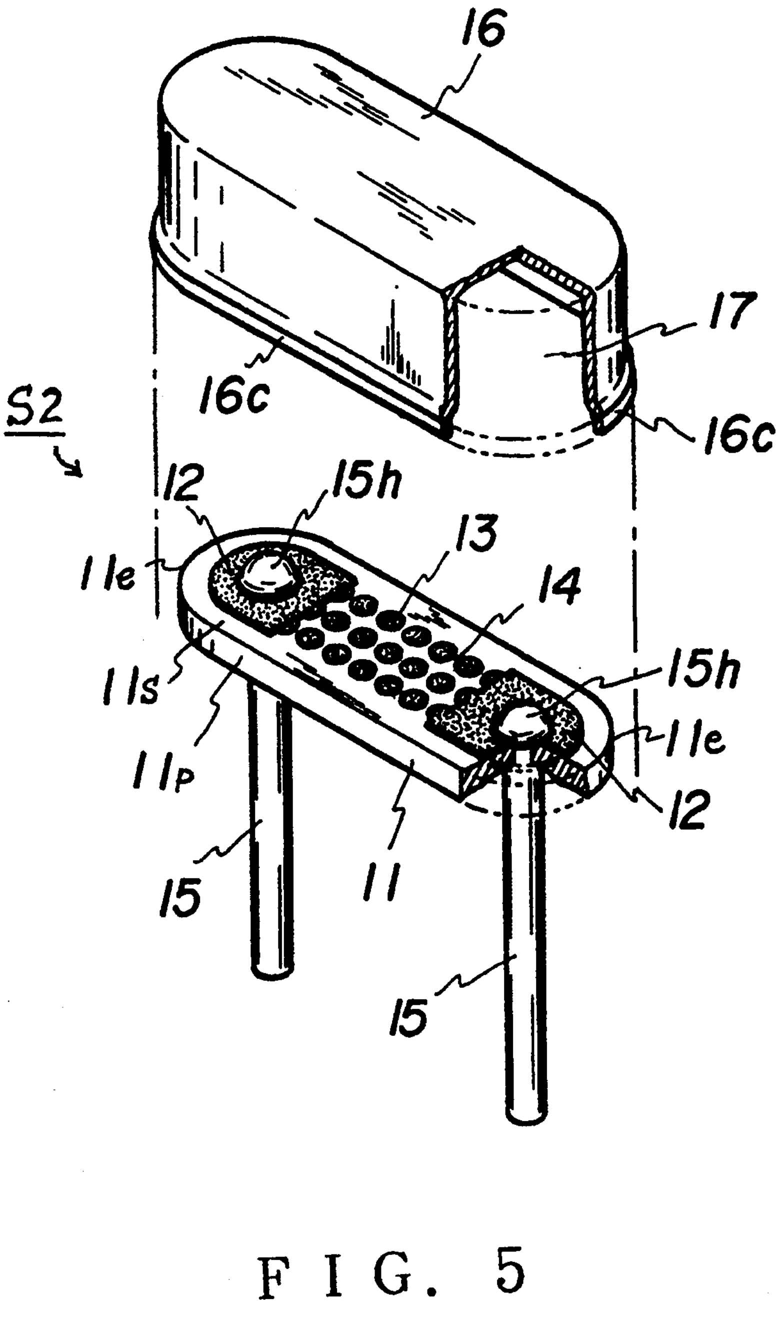
FIG. 5 is a partially cut-away, partially disassembled, front, top, right-side perspective view of a second embodiment of a surge absorber of the present invention.

FIG. 5 is a partially cut-away, partially disassembled front, top, right-side perspective view of a surge absorber S2 which is the second embodiment of the present invention. In this embodiment, a flat plate-like insulating body 11 is disposed horizontally so that a flat top surface 11s thereof also horizontal and facing upward. Each of the opposite ends 11e of the insulating body 11 is semicircularly shaped. The material of the insulating body 11 is the same as the one of the first embodiment. On the top surface 11s, a pair of terminal electrodes 12, 12 are formed in the proximity of the opposite ends 11e and discharge electrodes 13 are formed between the terminal electrodes 12, 12. As in the case of the first embodiment, the terminal electrodes 12 and the discharge electrodes 13 are made of an electrically conductive thin film. Top parts 15h, 15h of a pair of vertical terminal leads 15, 15 18 penetrate the insulating body 11 and make electrical contact with the respective terminal electrodes 12, 22. The top parts 15h,15h are rigidly secured to the insulating body 11 and the respective terminal electrodes 12 by means of press-fitting, electrically conductive bonding, or soldering. The insulating body 11, together with the terminal electrodes 12, 12 and discharge electrodes 13 thereon, is capped by an enclosing cap 16. The enclosing cap 16 is made of metal or an insulating material such as glass, ceramic, etc. The bottom part of the enclosing cap 16 is open and has a fitting flange 16c along the periphery of the bottom open part. The fitting flange 16c fits the periphery 11p of the insulating body 11 when the insulating body 11 is capped by the enclosing cap 16 so as to be hermetically sealed thereby. As the insulating body 11 is capped and sealed by the enclosing cap 16, the inside 7 of the enclosing cap 16 is filled with a gas which is inert gas, nitrogen gas, sulfur hexafluoride ($SF_6$), or air.

Although a gas-filled surge absorber is prior known, a proper gas is selected in consideration of the kind of the material of the terminal and the discharge electrodes used for the surge absorbers of the present invention. TABLE 1 below shows usable gases and unusable gases against various materials of the terminal and the discharge electrodes used for the surge absorbers of the present invention. The kind of the gas and the pressure of the gas cause the discharge starting voltage to vary even though the terminal and the discharge electrodes are arranged in an identical pattern.

TABLE 1

| No. | Electrode Material | Usable Gas | Unusable Gas |
|---|---|---|---|
| 1 | Metal | Gas containing $O_2$, Oxidizing gas | Inert gas, Sulfur Hexafluoride ($SF_6$) |
| 2 | Carbon | Gas containing $O_2$, Oxidizing gas | Inert gas, Sulfur Hexafluoride ($SF_6$) |
| 3 | Metal Oxide | $H_2$ (or $N_2$) reducing gas | Inert gas, Sulfur Hexafluoride ($SF_6$), Air, (or $N_2$) |
| 4 | Nitrogen complexes | | Inert gas, Sulfur Hexafluoride ($SF_6$), Air, $N_2$, $H_2$ |

Next, the third embodiment of the present invention will be described in reference to FIG. 6.

Figure 6:
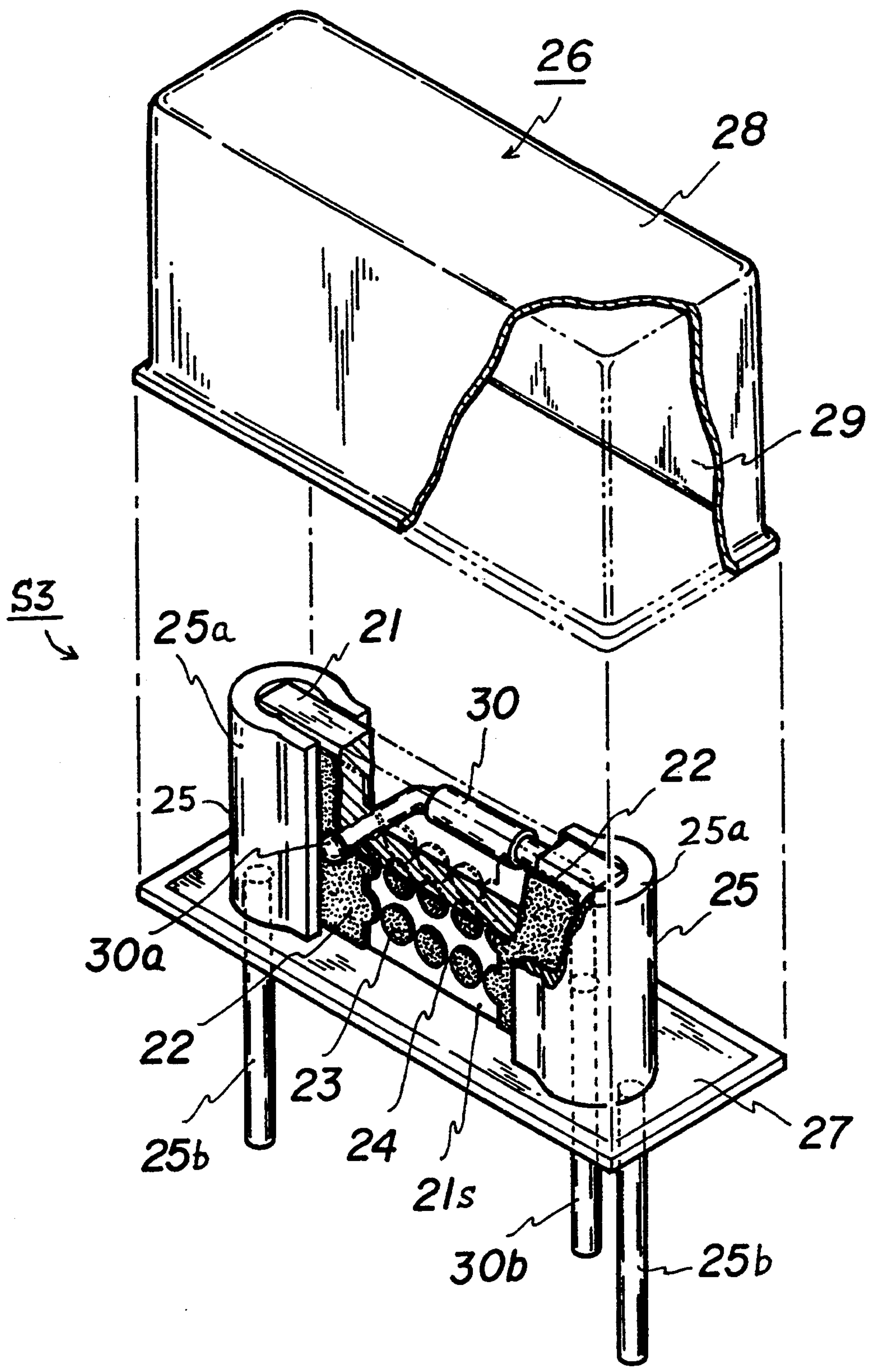
FIG. 6 is a partially cut-away, partially disassembled front, top, right-side perspective view of a third embodiment of a surge absorber of the present invention.
Figure 7:
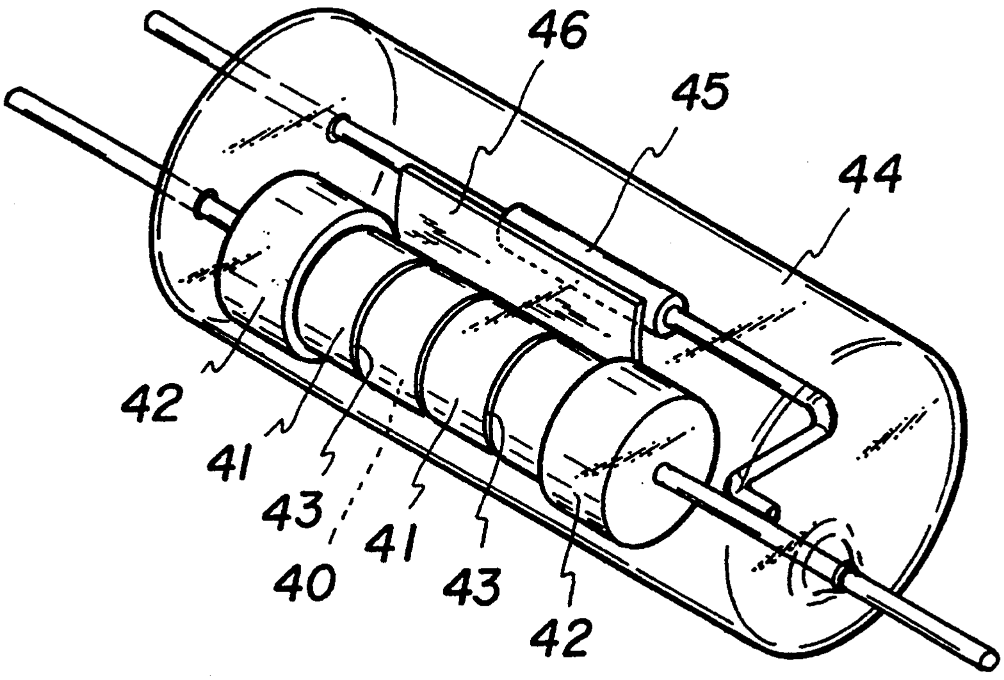
F I G. 7 (PRIOR ART)
FIG. 7 is a perspective view of one of conventional surge absorbers.

FIG. 6 is a partially cutaway, partially disassembled front, top, right-side perspective view of a surge absorber S3 which is the third embodiment of the present invention. In this embodiment, a flat rectangular shaped insulating body 21 is disposed vertically so that a flat surface 21s thereof also vertical. On the surface 21s are formed a pair of terminal electrodes 22, 22, disposed at, one, in the proximity of, the opposite ends of the surface 21s, discharge electrodes 23 between the terminal electrodes 22, 22, and micro discharging gaps 24 between each of the terminal electrodes 22 22 and the respective discharge electrodes 23 adjacent thereto and between the discharge electrodes 23 adjacent to each other. The surge absorber S3 also has a pair of electrically conductive terminals 25 25 each of which consists of a holder 25a and a lead 25b. Each end of the insulating body 21 is securely press-fitted to the holder 25a of each of the terminals 25, 25 so that each of the terminal electrodes 22, 22 is electrically connected to each of the terminals 25, 25. The surge absorber 23 further has an enclosure 26 which consists of a flat horizontal rectangular-shaped base plate 27 and a cap 28. All of the constituent parts of the surge absorber S3, except the leads 25b, are mounted on the base plate 27. The bottom end of the cap 28 is open and the bottom periphery thereof is securely and hermetically fitted to the peripheral the base plate 27.

Thus, the construction of the basic part of the surge absorber 23 of the third embodiment, as described above, is similar to the ones of the first and the second embodiment.

The surge absorber S3 of the third embodiment additionally includes a thermostatic fuse 30 having fuse leads 34a, 30b. The thermostatic fuse 30 is intended to break the circuit when the environmental temperature of the inside 29 of the enclosure 26 has reached a specified level. The fuse 30 is disposed on the side of the insulating body 21 opposite to the side of the surface 21s on which terminal electrodes 22, 22 and the discharge electrodes 23 are formed so that the insulating body 21 is interposed between the thermostatic fuse 30 and the discharge electrodes 23. Therefore, any splash of the fused metal may not reach any of the discharging gaps 24 on the surface 21s to cause short-circuiting between the terminal electrodes 22, 22. The fuse lead 30a is electrically connected to one of the terminal electrodes 22 through the insulating body 21 and the other fuse lead 30b extends downwardly through the base plate 27.

Next, data obtained from the experiments using surge absorbers according to the present invention are given in TABLE 2 below.

In the experiment, the discharge electrodes of all of the surge absorbers tested were arranged in a 4-row, 5-column pattern. Three kinds of specification of test samples, an ten pieces of each kind were used for the experiment. Data were obtained from 30 times of testing per each piece of sample: i.e. 300 times per specification of sample, a total of 900 times of testing.

TABLE 2

| Spec. No. | Gap (μm) | Diameter of Discharge Electrode (mm) | Gas (mmHg) | Discharge Starting Voltage (kV) | Distribution of Discharge Starting Voltages ±10% | ±15% | ±20% |
|---|---|---|---|---|---|---|---|
| 1 | 100 | 0.5 | $SF_6$ (100) | 2.13 | 100% | 100% | 100% |
| 2 | 200 | 0.5 | Ar (200) | 1.24 | 70% | 90% | 100% |
| 3 | 100 | 0.5 | $SF_6$ (100) | 2.12 | 60% | 100% | 100% |

$SF_6$: Sulfur Hexafluoride

It was found from the experiment that the discharge starting voltages of the surge absorbers according to the present invention were quite stable and within a satisfactory tolerance range. On the other hand, a separate experiment revealed only about 20% of samples of conventional surge absorbers tested were within the ±10% range, and only about 80% were within the ±20% range.

In an additional experiment on the surge absorbers according to the present invention, test data were obtained 300 times per piece of sample. In this experiment, the tested samples not only exhibited very stable discharge starting voltages but also satisfactorily withstood the large number of repeated testings to prove an excellent encourage capability.

Now, the effects and the merits of the surge absorber of the present invention will be itemized below:

(1) Since the arrangement of the terminal electrodes discharge electrodes and the micro discharging gaps are made in a pattern and the terminal electrodes and the discharge electrodes can be formed on a flat surface of an insulating body in the form of a thin film by means of a printing etc., surge absorbers having a stable discharge voltage and an excellent endurance capability can easily be mass-produced at low cost.

(2) By properly determining the arrangement pattern of the discharge electrodes and the micro discharging gaps, various surge absorbers of broad scope of discharge starting voltages and discharge currents can be produced. Furthermore, by changing the kind of the filled with gas or the gas pressure, various discharge voltages and discharge currents can be obtained without changing the arrangement pattern of the discharge electrodes and the micro discharging gaps.

(3) Since the thermostatic fuse is disposed on the side of the insulating body opposite to the side of the surface on which terminal electrodes and the discharge electrodes are formed, any splash of the fused metal will not reach the opposite side and bridge the discharging gaps to cause an accidental short-circuiting of the surge absorber.

It will be understood that various changes and modifications may be made in the above described embodiments which provide the characteristics of this invention without departing from the spirit and principle thereof particularly as defined in the following claims.

What is claimed is:

1. A surge absorber for protecting an electrical circuit from a surge voltage, comprising:

(a) an insulating body having a substantially planar flat surface, a first end and a second end;

(b) a first electrically conductive terminal electrode formed in a thin-film form on said flat surface in the proximity of said first end;

(c) a second electrically conductive terminal electrode formed in a thin-film form on said flat surface in the proximity of said first end;

(d) one or more electrically conductive discharging electrodes formed in a thin-film form on said flat surface between said first terminal electrode and said second terminal electrode in such a manner that micro discharging gaps are present between said first terminal electrode and any of said discharge electrodes adjacent thereto, and between said second terminal electrode and any of said discharge electrodes adjacent thereto, and between any discharge electrodes adjacent to each other; and (e) an electrically conductive first terminal having a first terminal lead;

(f) an electrically conductive second terminal having a second terminal lead, said first terminal electrode and second terminal electrode being electrically connected to said first terminal and said second terminal, respectively.

2. A surge absorber according to claim 1, wherein each of said discharge electrodes has an identical circular shape.

3. A surge absorber according to claim 2, wherein said discharging electrodes are arranged in a row and column pattern, the word "row" signifying the alignment direction across said first terminal electrode and said second terminal electrode and the word "column" signifying the alignment direction perpendicular to the "row" direction, the dimension each of said discharging gaps in a "row" being equal.

4. A surge absorber according to claim 2, wherein said discharging electrodes are arranged in such a manner that the centers of any of said discharge electrodes adjacent to each other form a right triangle.

5. A surge absorber according to claim 1, the surge absorber further comprising:

(g) a thermostatic fuse having a first fuse lead and a second fuse lead, said thermostatic fuse being disposed on an opposite side of said insulating body from the side of said flat surface so that said insulating body is interposed between said thermostatic fuse and said micro discharging gaps on said flat surface, said first fuse lead being electrically connected to said first terminal electrode; and (h) a gas filled enclosure hermetically enclosing at least a part of the surge absorber.

6. A surge absorber according to claim 5, wherein said gas-filled enclosure includes an enclosing cap, a bottom part of said enclosing cap being open and having a fitting flange along the periphery of the bottom open part, said fitting flange fitting with said insulating body.

7. A surge absorber according to claim 5, wherein said gas-filled enclosure includes a base plate and an enclosing cap, said insulating body being mounted on said base plate, a bottom part of said enclosing cap being open and having a fitting flange along the periphery of the bottom open part, said fitting flange fitting with said base plate.

8. A surge absorber for protecting an electrical circuit from a surge voltage, comprising:

(a) an insulating body having a substantially planar flat surface, a first end and a second end;

(b) a first electrically conductive terminal electrode formed in a thin-film form on said flat surface in the proximity of said first end;

(c) a second electrically conductive terminal electrode formed in a thin-film form on said flat surface in the proximity of said second end;

(d) a plurality of electrically conductive discharging electrodes formed in a thin-film form on said flat surface between said first terminal electrode and said second terminal electrode in such a manner that micro discharging gaps are present between said first terminal electrode and any of said discharge electrodes adjacent thereto, and between said second terminal electrode and any of said discharge electrodes adjacent thereto, and between any discharge electrodes adjacent to each other;

(e) a electrically conductive first terminal having a first holder and a first lead, said first holder securely holding said first end so that said first terminal electrode is electrically connected to said first terminal; and (f) an electrically conductive second terminal having a second holder and a second lead, said second holder securely holding said second end so that said second terminal electrode is electrically connected to said second terminal.

9. A surge absorber according to claim 8, wherein each of said discharge electrodes has an identical circular shape.

10. A surge absorber according to claim 9, wherein said discharging electrodes are arranged in a row and column pattern, the word "row" signifying the alignment direction across said first terminal electrode and said second terminal electrode and the word "column" signifying the alignment direction perpendicular to the "row" direction, the dimension of each of said discharging gaps in a "row" being equal.

11. A surge absorber according to claim 9, wherein said discharging electrodes are arranged in such a manner that the centers of any of said discharge electrodes adjacent to each other form a right triangle.

12. A surge absorber according to claim 8, the surge absorber further comprising:

(g) a thermostatic fuse having a first fuse lead and a second fuse lead, said thermostatic fuse being disposed on an opposite side of said insulating body from the side of said flat surface so that said insulating body is interposed between said thermostatic fuse and said micro discharging gaps on said flat surface, said first fuse lead being electrically connected to said first terminal electrode; and (h) a gas-filled enclosure hermetically enclosing at least a part of the surge absorber.

13. A surge absorber according to claim 12, wherein said gas-filled enclosure includes an enclosing cap, a bottom part of said enclosing cap being open and having a fitting flange along the periphery of the bottom open part, said fitting flange fitting with said insulating body.

14. A surge absorber according to claim 12, wherein said gas-filled enclosure includes a base plate and an enclosing cap, said insulating body and said holders being mounted on said base plate, a bottom part of said enclosing cap being open and having a fitting flange along the periphery of the bottom open part, said fitting flange fitting with said base plate.

* * * * *